(12) United States Patent
Luo

(10) Patent No.: US 12,531,469 B2
(45) Date of Patent: Jan. 20, 2026

(54) ON-TIME CONTROLLER, POWER CONVERTER AND SWITCHING OPERATION METHOD FOR THE POWER CONVERTER

(71) Applicant: CYNTEC CO., LTD., Hsinchu (TW)

(72) Inventor: Yi-Jie Luo, Hsinchu (TW)

(73) Assignee: CYNTEC CO., LTD., Hsinchu (TW)

( * ) Notice: Subject to any disclaimer, the term of this patent is extended or adjusted under 35 U.S.C. 154(b) by 210 days.

(21) Appl. No.: 18/403,693

(22) Filed: Jan. 3, 2024

(65) Prior Publication Data

US 2025/0079970 A1 Mar. 6, 2025

(30) Foreign Application Priority Data

Aug. 28, 2023 (TW) ................. 112132258

(51) Int. Cl.
*H02M 1/08* (2006.01)
*H02M 1/00* (2006.01)

(52) U.S. Cl.
CPC ........... *H02M 1/08* (2013.01); *H02M 1/0025* (2021.05)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566;
(Continued)

(56) References Cited

U.S. PATENT DOCUMENTS 9,300,212 B2 3/2016 Notman
11,258,365 B2 * 2/2022 Hsieh .............. G01R 19/16528
(Continued)

FOREIGN PATENT DOCUMENTS

TW 202213921 A 4/2022
TW 202230951 A 8/2022

*Primary Examiner* — Jeffrey A Gblende
(74) *Attorney, Agent, or Firm* — Winston Hsu

(57) ABSTRACT

An on-time controller, for controlling a switching operation of a power converter includes an on-time controlling circuit, configured to control an on-time signal of a switch circuit of the power converter according to a reference voltage, wherein the reference voltage is varied according to an output voltage of an output terminal of the switch circuit; and a frequency adjusting circuit, coupled to the on-time controlling circuit, configured to sense the output voltage of the output terminal of the switch circuit, generate a load sensing current according to the output voltage, and provide the load sensing current to the on-time controlling circuit for compensating the reference voltage to adjust the on-time signal of the switch circuit and a switching frequency of the switch circuit.

20 Claims, 5 Drawing Sheets

(58) Field of Classification Search
CPC ............. H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069
See application file for complete search history.

(56) References Cited

U.S. PATENT DOCUMENTS

| | | | |
|---|---|---|---|
| 11,757,359 B2* | 9/2023 | Dharmalinggam | H02M 1/08 |
| | | | 323/282 |
| 12,249,919 B2* | 3/2025 | Guo | H02M 1/44 |
| 2022/0190722 A1* | 6/2022 | Zhang | H02M 1/0032 |

* cited by examiner

ON-TIME CONTROLLER, POWER CONVERTER AND SWITCHING OPERATION METHOD FOR THE POWER CONVERTER

BACKGROUND OF THE INVENTION

1. Field of the Invention

The present invention relates to an on-time controller, a power converter and a switching operation method for the power converter, and more particularly, to an on-time controller, a power converter and a switching operation method for the power converter capable of adjusting or compensating the operation frequency of the power converter.

2. Description of the Related Art

Please refer to FIG. 1, which is a schematic diagram of a conventional power converter 10 with ripple-based constant on-time (RBCOT) control. The power converter 10 includes a comparator CMP, a constant on-time generator 102, a flip-flop FF and a switch driving circuit 104. The power converter 10 is operated by the fast transient response, which provides an output voltage VOUT to a loading LOAD. More specifically, the power converter 10 compares a divisional voltage VFB of the output voltage VOUT and a reference voltage VREF. When the voltage VFB is smaller than the reference voltage VREF, the constant on-time generator 102 of the power converter 10 is triggered to generate an on-reset signal TON_RESET, such that the switch driving circuit 104 of the power converter 10 performs a switching operation. Therefore, the power converter 10 may transform an input voltage VIN into the output voltage VOUT.

Please refer to FIG. 2, which is a schematic diagram of a conventional constant on-time generator 102. When a voltage VIN_TON of a capacitor C_TON of the constant on-time generator 102 is increased and the voltage VIN_TON is higher than a threshold VO_TON, the on-reset signal TON_RESET is reset to a low voltage level from a high voltage level, and therefore the switch driving circuit 104 performs the switching operation. However, under such operation, an off period TOFF of the power converter 10 is decreased with the increase of the loading LOAD of the power converter 10, and a switching frequency of the power converter 10 is increased.

Therefore, improvements are necessary to the conventional technique.

SUMMARY OF THE INVENTION

In light of this, the present invention provides an on-time controller, a power converter and a switching operation method for the power converter to adjust an operation frequency of the power converter.

An embodiment of the present invention provides an on-time controller, for controlling a switching operation of a power converter, comprises an on-time controlling circuit, configured to control an on-time signal of a switch circuit of the power converter according to a reference voltage, wherein the reference voltage is varied according to an output voltage of an output terminal of the switch circuit; and a frequency adjusting circuit, coupled to the on-time controlling circuit, configured to sense the output voltage of the output terminal of the switch circuit, generate a load sensing current according to the output voltage, and provide the load sensing current to the on-time controlling circuit for compensating the reference voltage to adjust the on-time signal of the switch circuit and a switching frequency of the switch circuit.

Another embodiment of the present invention provides a power converter, comprises a switch circuit, including an output terminal connected to a loading, configured to generate an output voltage according to on/off of the switch circuit and to provide the output voltage to the loading; and an on-time controller, coupled to the switch circuit, comprises an on-time controlling circuit, configured to control an on-time signal of the switch circuit of the power converter according to a reference voltage, wherein the reference voltage is varied according to an output voltage of an output terminal of the switch circuit; and a frequency adjusting circuit, coupled to the on-time controlling circuit, configured to sense the output voltage of the output terminal of the switch circuit, generate a load sensing current according to the output voltage, and provide the load sensing current to the on-time controlling circuit for compensating the reference voltage to adjust the on-time signal of the switch circuit and a switching frequency of the switch circuit.

Another embodiment of the present invention provides a switching operation method for a power converter, wherein the power converter comprises a switch circuit and an on-time controller, and the on-time controller comprises an on-time controlling circuit and a frequency adjusting circuit, the switching operation method comprises controlling, by the on-time controlling circuit, an on-time signal of a switch circuit of the power converter according to a reference voltage, wherein the reference voltage is varied according to an output voltage of an output terminal of the switch circuit; and sensing, by the frequency adjusting circuit, the output voltage of the output terminal of the switch circuit to generate a load sensing current according to the output voltage, and providing the load sensing current to the on-time controlling circuit for compensating the reference voltage to adjust the on-time signal of the switch circuit and a switching frequency of the switch circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
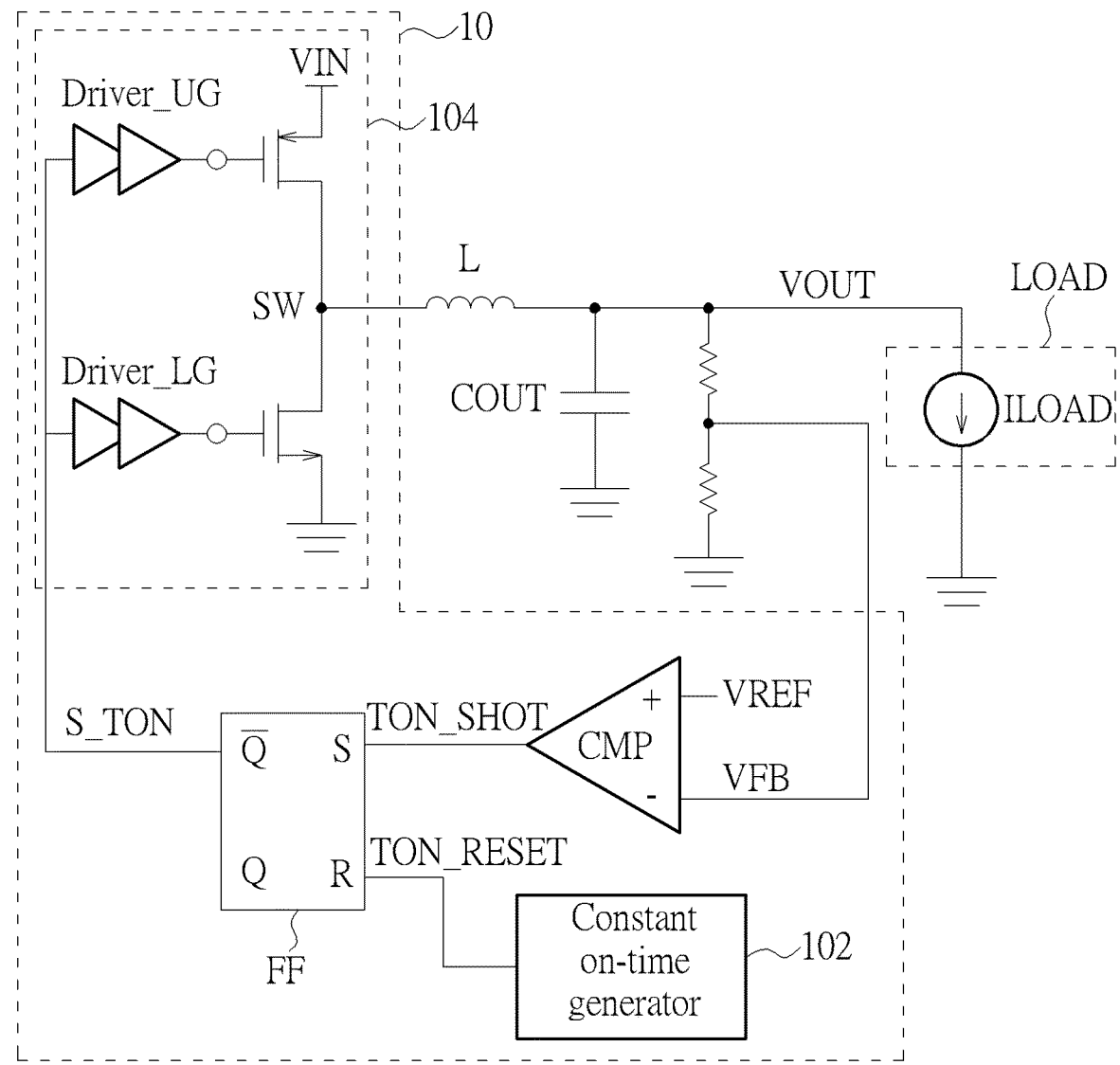
FIG. 1 is a schematic diagram of a conventional power converter with ripple-based constant on-time control.
Figure 2:
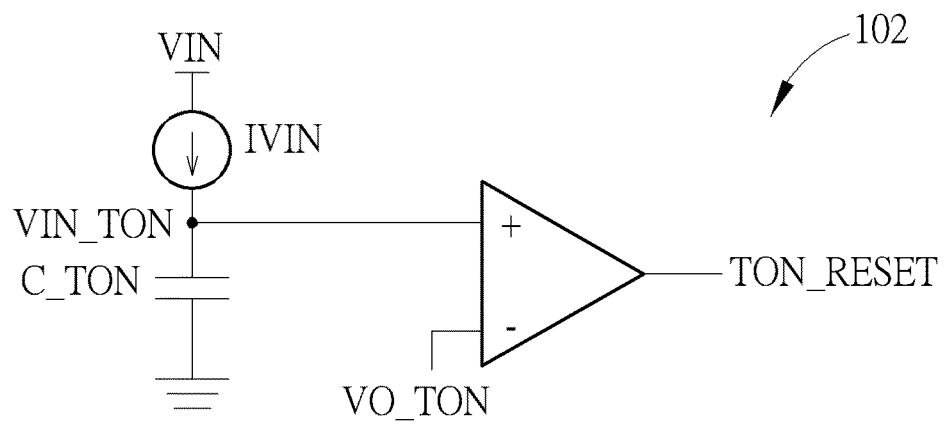
FIG. 2 is a schematic diagram of a conventional constant on-time generator.
Figure 3:
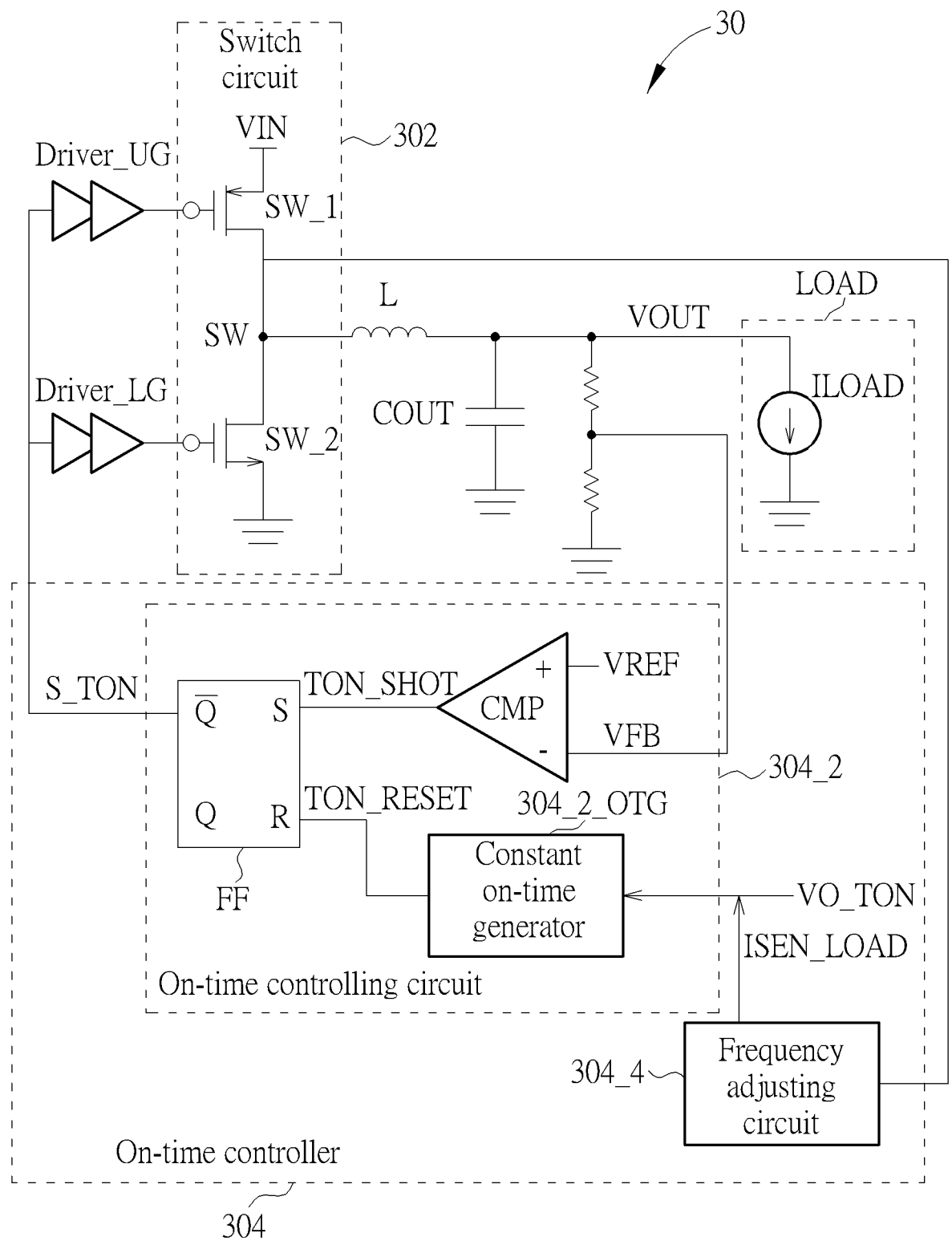
FIG. 3 is a schematic diagram of a power converter according to an embodiment of the present invention.

Please refer to FIG. 3, which is a schematic diagram of a power converter 30 according to an embodiment of the present invention. The power converter 30 includes a switch circuit 302, an on-time controller 304 and drivers Driver_UG, Driver_LG. The switch circuit 302 includes an output terminal SW connecting to a loading LOAD. The switch circuit 302 is configured to generate an output voltage VOUT according to on/off of the switch circuit 302 and to provide the output voltage VOUT to the loading LOAD. The on-time controller 304 is coupled to the switch circuit 302, which includes an on-time controlling circuit 304_2 and a frequency adjusting circuit 304_4. The on-time controlling circuit 304_2 is configured to control an on-time signal S_TON of the switch circuit 302 of the power converter 30 according to a reference voltage VO_TON, wherein the reference voltage VO_TON is varied according to an output voltage VSW of the output terminal SW of the switch circuit 302. The frequency adjusting circuit 304_4 is coupled to the on-time controlling circuit 304_2, and is configured to configured to sense the output voltage VSW of the output terminal SW of the switch circuit 302, and to generate a load sensing current ISEN_LOAD according to the output voltage VSW, and the load sensing current ISEN_LOAD is provided to the on-time controlling circuit 304_2 for compensating the reference voltage VO_TON to adjust the on-time signal S_TON of the switch circuit 302 and a switching frequency of the switch circuit 302.

In detail, the switch circuit 302 includes a first switch SW_1 and a second switch SW_2, wherein the first switch SW_1 and the second switch SW_2 may be Metal-Oxide-Semiconductor Field-Effect Transistor (MOSFET) switches. In the example, the first switch SW_1 is a PMOS switch, the second switch SW_2 is an NMOS switch, but not limited thereto.

The first switch SW_1 and the second switch SW_2 are respectively coupled to the drivers Driver_UG, Driver_LG. When the switch circuit 302 is conducted, i.e. the first switch SW_1 is on and the second switch SW_2 is off, the detection of an inductor current iL is not performed by the embodiment of the present invention. When the switch circuit 302 is off, i.e., the first switch SW_1 is off and the second switch SW_2 is on, the power converter 30 senses the inductor current iL flowing through the output terminal SW, and compensates a frequency variation due to a variation of the loading LOAD according to the sensed inductor current iL. The above compensation amount may be provided to the on-time controlling circuit 304_2 to compensate the reference voltage VO_TON and to correspondingly adjust the on-time signal S_TON of the switch circuit 302, e.g. increase an on period TON in a period of the on-time signal S_TON.

Notably, according to an embodiment of the present invention, a duty cycle of the switch circuit 302 of the power converter 30 is a constant, and a single duty cycle of the switch circuit 302 is composed of the on period TON and an off period TOFF. Therefore, the frequency adjusting circuit 304_4 may correspondingly adjust the off period TOFF of the switch circuit 302 according to the on period TON of the on-time signal S_TON. As such, the power converter 30 may adjust the off period TOFF of the power converter 30 according to the sensed inductor current iL.

The on-time controlling circuit 304_2 includes a comparator CMP, a constant on-time generator 304_2_OTG and a flip-flop FF. The comparator CMP is configured to compare a reference voltage VREF and a voltage VFB related to the output voltage VOUT to generate a signal TON_SHOT.

Figure 4:
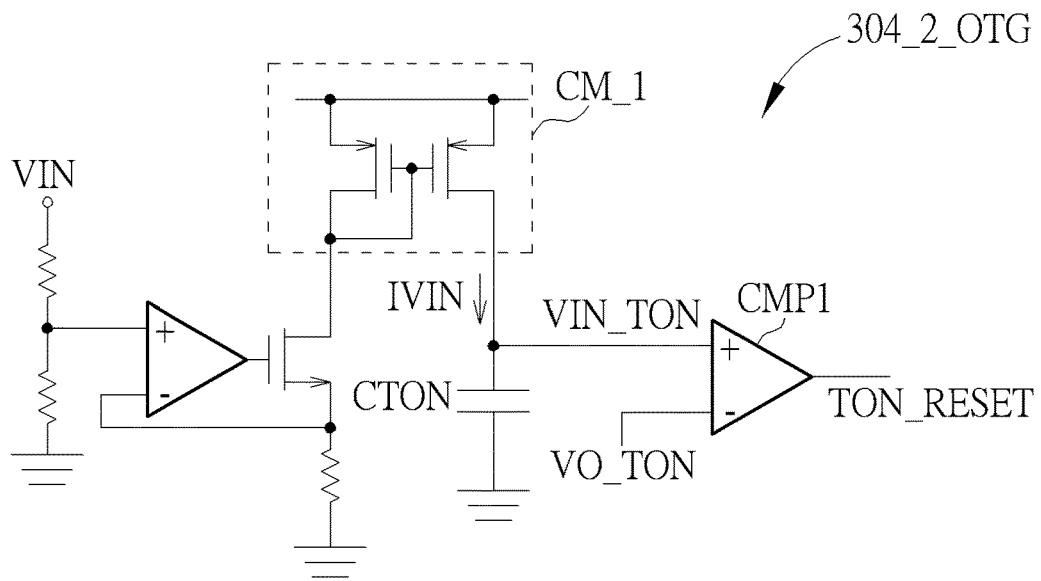
FIG. 4 is a schematic diagram of a constant on-time generator according to an embodiment of the present invention.

Please refer to FIG. 4, which is a schematic diagram of the constant on-time generator 304_2_OTG according to an embodiment of the present invention. The constant on-time generator 304_2_OTG includes a capacitor C_TON, a first current mirror CM_1 and a comparator CMP1. The first current mirror CM_1 is configured to generate an input current IVIN to charge the capacitor C_TON according to an input voltage VIN. The comparator CMP1 is coupled to the capacitor C_TON and the first current mirror CM_1, configured to compare a capacitor voltage VIN_TON of the capacitor C_TON and the reference voltage VO_TON to determine an on-reset signal TON_RESET, wherein the on-reset signal TON_RESET is a pulse signal for determining the on-time signal S_TON of the switch circuit 302.

Please refer to FIG. 3, the on-time signal S_TON is generated by the flip-flop FF according to the on-reset signal TON_RESET and the signal TON_SHOT, wherein the on-time signal S_TON may be a pulse-width modulation (PWM) signal and the PWM signal may be determined by the on-reset signal TON_RESET. For example, when the on-reset signal TON_RESET is a high voltage level pulse signal, the on-time signal S_TON is switched from a high voltage level to a low voltage level, i.e. from the on period TON to the off period TOFF, and a falling edge of the PWM signal is simultaneously determined.

Figure 5:
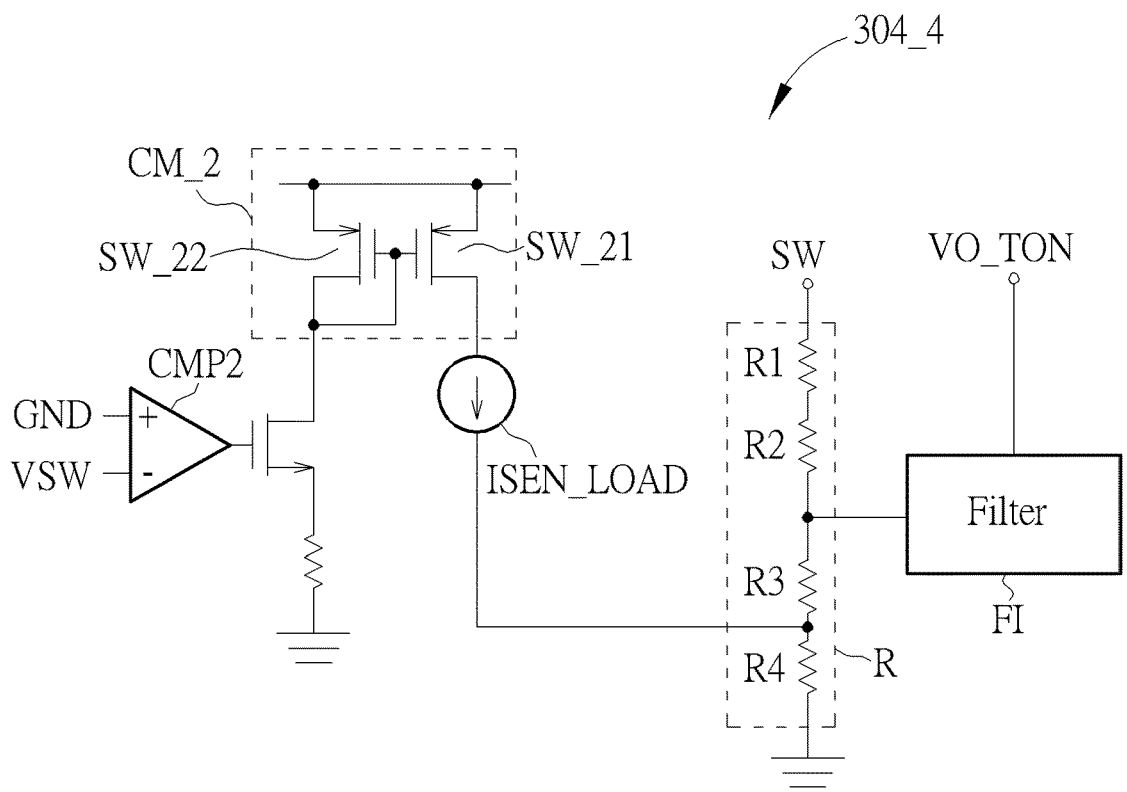
FIG. 5 is a schematic diagram of a frequency adjusting circuit according to an embodiment of the present invention.

Please refer to FIG. 5, which is a schematic of the frequency adjusting circuit 304_4 according to an embodiment of the present invention. The frequency adjusting circuit 304_4 includes a comparator CMP2, a second current mirror CM_2, a resistor unit R and a filter FI. The comparator CMP2 is configured to compare a ground voltage GND and the output voltage VSW of the output terminal SW of the switch circuit 302 to output a comparison result. The second current mirror CM_2 is coupled to the comparator CMP2 and is configured to generate the load sensing current ISEN_LOAD according to the comparison result of the comparator CMP2. The resistor unit R is coupled to the second current mirror CM_2, and includes resistors R1, R2, R3, R4 (a number and values of each resistor of the resistor unit R may be adjusted according to system requirements and not limited thereto) for receiving the load sensing current ISEN_LOAD provided by the second current mirror CM_2 to generate a compensation voltage corresponding to the load sensing current ISEN_LOAD when the switch circuit 302 is off. The filter FI is coupled to the resistor unit R, and the filter FI may be an integrator for integrating the compensation voltage corresponding to the load sensing current ISEN_LOAD to determine the reference voltage VO_TON. In other words, the filter FI improves the reference voltage VO_TON according to an integration result of the load sensing current ISEN_LOAD.

In order to obtain information of the loading LOAD, the power converter 30 may sense the current of the output terminal SW. In an embodiment, the frequency adjusting circuit 304_4 is configured to sense the output voltage VSW of the output terminal SW to detect the inductor current iL of an inductor L when the switch circuit 302 is off, and the compensation for the variation of the loading LOAD is determined according to the inductor current iL.

Notably, the power converter 30 senses the inductor current iL flowing through the output terminal SW when the second switch SW_2 is on, thus the load sensing current ISEN_LOAD for compensation is fed back to the reference voltage VO_TON for the frequency compensation when the second switch SW_2 is on.

The comparator CMP2 of the frequency adjusting circuit 304_4 according to an embodiment of the present invention compares the ground voltage GND and the output voltage VSW of the output terminal SW of the switch circuit 302 to generate the load sensing current ISEN_LOAD, wherein when the output voltage VSW of the output terminal SW of the switch circuit 302 is less than 0, i.e. a switch SW_22 of the second current mirror CM_2 is turned on, the load sensing current ISEN_LOAD is increased with the decrease of the output voltage VSW; when the output voltage VSW is larger than 0, i.e. a switch SW_21 of the second current mirror CM_2 is turned on, no the load sensing current ISEN_LOAD is generated.

Based on the above embodiment for the frequency compensation, a voltage value VO_TON$_{COMP}$ is shown as formula (1):

$$VO\_TON_{COMP} = \\ VSW \times \frac{R3+R4}{R1+R2+R3+R4} \times \text{Duty} + \left[ R4 \parallel (R1+R2+R3) \times \frac{R1+R2}{R1+R2+R3} \times \text{ISEN\_LOAD} \times (1-\text{Duty}) \right] \quad (1)$$

wherein Duty denotes a duty cycle of the power converter 30, e.g. a ratio of a duty time period and a total time period of the power converter 30 in a cycle.

On the other hand, a relationship of the on period TON and the off period TOFF of the on-time signal S_TON of the power converter 30 is shown as formula (2) and formula (3):

$$TON = C\_TON \times \frac{VO\_TON}{IVIN} \quad (2)$$

$$TOFF = TON \times \frac{1-\text{Duty}}{\text{Duty}} \quad (3)$$

Since the duty cycle Duty of the switch circuit 302 is a constant, the load sensing current ISEN_LOAD of the frequency adjusting circuit 304_4 for compensation may increase the on-period TON and the off-period TOFF of the switch circuit 302.

Therefore, with the situation of the duty cycle of the power converter 30, the reference voltage VO_TON, the on-period TON and the off-period TOFF are increased with the load sensing current ISEN_LOAD for compensation, and a switching frequency of the switch circuit 302 of the power converter 30 is adjusted/compensated.

Figure 6:
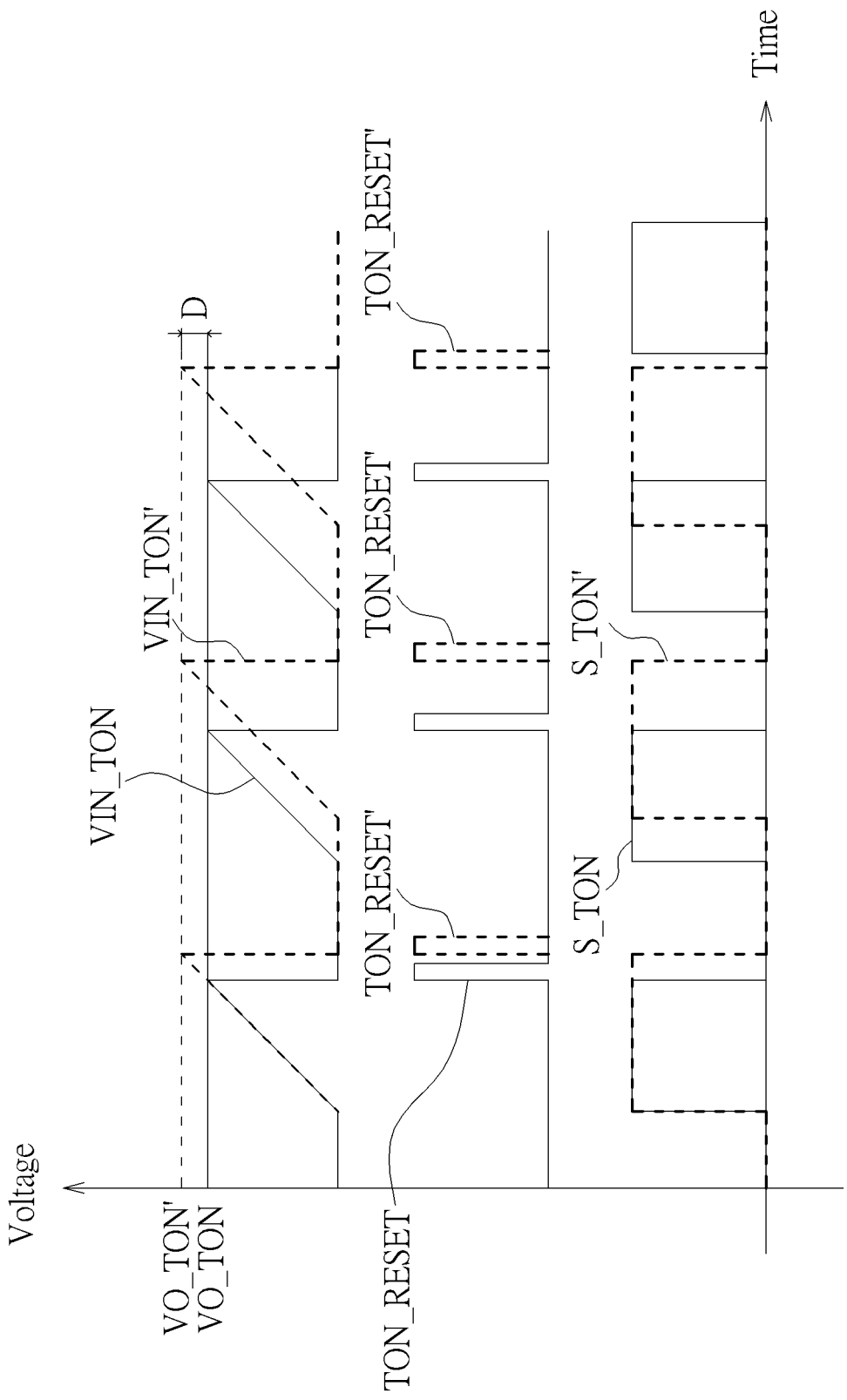
FIG. 6 is a timing diagram of a comparison of voltage nodes before and after frequency compensation according to an embodiment of the present invention.

Please refer to FIG. 6, which is a timing diagram of a comparison of voltage nodes before and after the frequency compensation according to an embodiment of the present invention. As shown in FIG. 6, compared to the reference voltage VO_TON, the on-reset signal TON_RESET and the on-time signal S_TON, the reference voltage VO_TON', the on-reset signal TON_RESET' and the on-time signal S_TON' are results with the frequency compensation of the power converter 30.

A loading compensation difference D exists between the reference voltage VO_TON' and the reference voltage VO_TON. With the frequency compensation of the power converter 30, a capacitor voltage VIN_TON' is increased to the reference voltage VO_TON' with an identical slope of the capacitor voltage VIN_TON. In such situation, the timing of the high voltage level pulse signal of the on-reset signal TON_RESET' is relatively postponed, such that the duration of the on-period TON of the on-time signal S_TON' is increased. In addition, since the duty cycle of the power converter 30 is a constant, the off-period TOFF of the power converter 30 is increased accordingly, and therefore the switching frequency of the switch circuit 302 of the power converter 30 can be adjusted/compensated.

Figure 7:
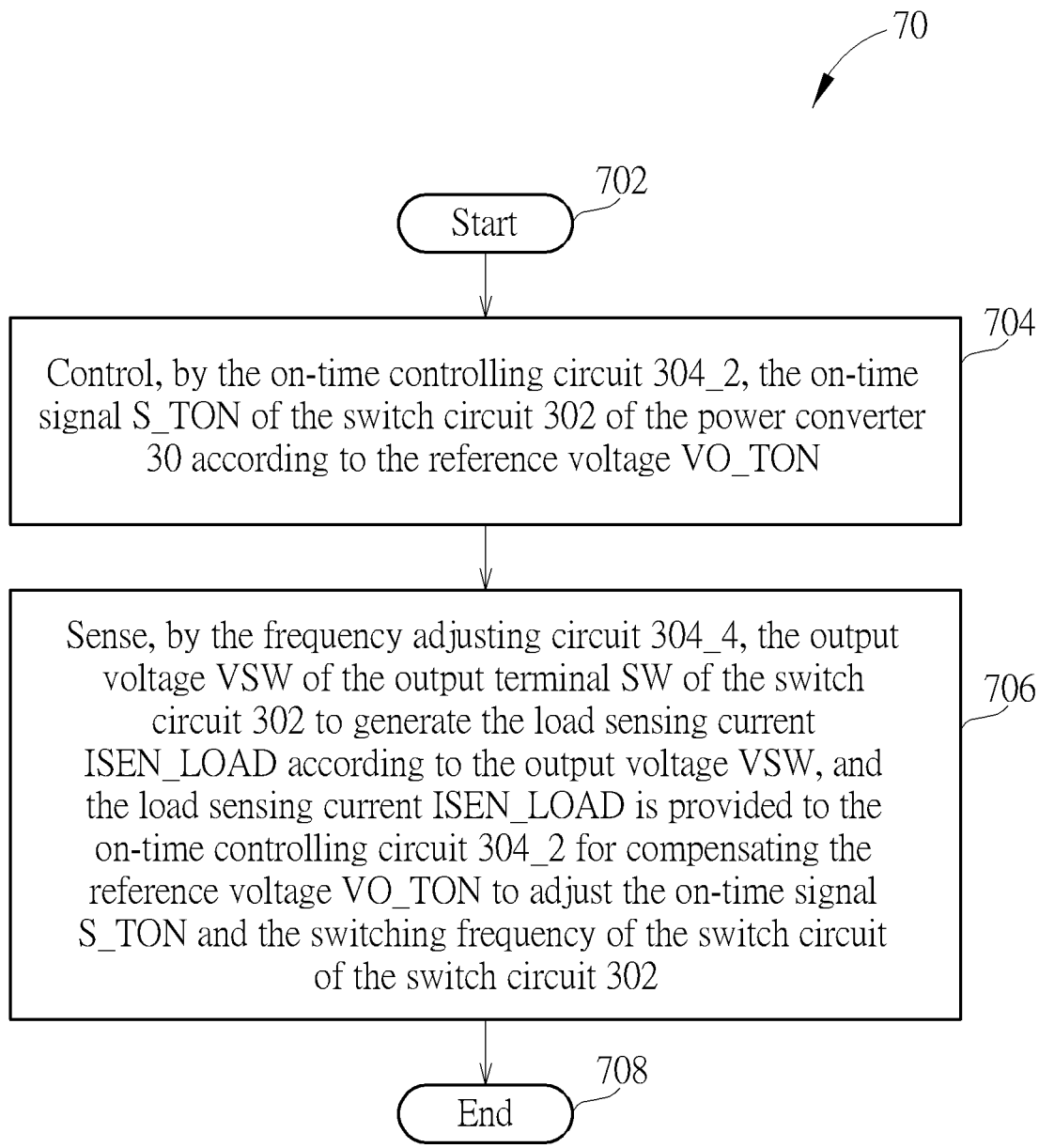
FIG. 7 is a schematic diagram of a switching operation method according to an embodiment of the present invention.

An operation method of the power converter 30 may be concluded as a switching operation method 70, as shown in FIG. 7. The switching operation method 70 of the power converter 30 includes the following steps:

Step 702: Start;
Step 704: Control, by the on-time controlling circuit 304_2, the on-time signal S_TON of the switch circuit 302 of the power converter 30 according to the reference voltage VO_TON;
Step 706: Sense, by the frequency adjusting circuit 304_4, the output voltage VSW of the output terminal SW of the switch circuit 302 to generate the load sensing current ISEN_LOAD according to the output voltage VSW, and the load sensing current ISEN_LOAD is provided to the on-time controlling circuit 304_2 for compensating the reference voltage VO_TON to adjust the on-time signal S_TON and the switching frequency of the switch circuit of the switch circuit 302;
Step 708: End.

Regarding operations of the switching operation method 70, please refer to the above mentioned embodiments of the power converter 30, and not narrated herein again for brevity.

In summary, the present invention provides an on-time controller, a power converter and a switching operation method for the power converter, which senses a loading current to perform a frequency compensation to adjust an operation frequency of the power converter.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An on-time controller, for controlling a switching operation of a power converter, comprising:
an on-time controlling circuit, configured to control an on-time signal of a switch circuit of the power converter according to a reference voltage, wherein the reference voltage is varied according to an output voltage of an output terminal of the switch circuit; and
a frequency adjusting circuit, coupled to the on-time controlling circuit, configured to sense the output voltage of the output terminal of the switch circuit, generate a load sensing current according to the output voltage, and provide the load sensing current to the on-time controlling circuit for compensating the reference voltage to adjust the on-time signal of the switch circuit and a switching frequency of the switch circuit.

2. The on-time controller of claim 1, wherein the frequency adjusting circuit is configured to sense the output voltage of the output terminal to detect an inductor current when the switch circuit is off.

3. The on-time controller of claim 1, wherein the frequency adjusting circuit is configured to adjust an off period of the switch circuit according to an on period of the on-time signal, wherein a duty cycle of the switch circuit is a constant.

4. The on-time controller of claim 1, wherein the switch circuit is configured to generate an output voltage to a loading of the power converter according to on/off of the switch circuit.

5. The on-time controller of claim 1, wherein the on-time controlling circuit comprises:

a capacitor;
a first current mirror, configured to generate an input current to charge the capacitor according to an input voltage; and
a comparator, coupled to the capacitor and the first current mirror, configured to compare a capacitor voltage of the capacitor and the reference voltage to determine an on-reset signal.

6. The on-time controller of claim 1, wherein the frequency adjusting circuit comprises:
a comparator, configured to compare a ground voltage and the output voltage of the output terminal of the switch circuit to output a comparison result;
a second current mirror, coupled to the comparator, configured to generate the load sensing current according to the comparison result;
a resistor unit, coupled to the second current mirror, configured to receive the load sensing current provided by the second current mirror to generate a compensation voltage corresponding to the load sensing current when the switch circuit is off; and
a filter, coupled to the resistor unit, configured to integrate the compensation voltage corresponding to the load sensing current to determine the reference voltage.

7. The on-time controller of claim 6, wherein when the output voltage of the output terminal of the switch circuit is smaller than zero, the load sensing current is increased when the output voltage is decreased.

8. The on-time controller of claim 1, wherein when a duty cycle of the switch circuit is a constant, the frequency adjusting circuit is configured to compensate the load sensing current to increase an on period of the on-time signal and an off period of the switch circuit.

9. A power converter, comprising:
a switch circuit, comprising an output terminal connected to a loading, configured to generate an output voltage according to on/off of the switch circuit and to provide the output voltage to the loading; and
an on-time controller, coupled to the switch circuit, comprising:
an on-time controlling circuit, configured to control an on-time signal of the switch circuit of the power converter according to a reference voltage, wherein the reference voltage is varied according to an output voltage of an output terminal of the switch circuit; and
a frequency adjusting circuit, coupled to the on-time controlling circuit, configured to sense the output voltage of the output terminal of the switch circuit, generate a load sensing current according to the output voltage, and provide the load sensing current to the on-time controlling circuit for compensating the reference voltage to adjust the on-time signal of the switch circuit and a switching frequency of the switch circuit.

10. The power converter of claim 9, wherein the frequency adjusting circuit is configured to sense the output voltage of the output terminal to detect an inductor current when the switch circuit is off.

11. The power converter of claim 9, wherein the frequency adjusting circuit is configured to adjust an off period of the switch circuit according to an on period of the on-time signal, wherein a duty cycle of the switch circuit is a constant.

12. The power converter of claim 9, wherein the on-time controlling circuit comprises:
a capacitor;
a first current mirror, configured to generate an input current to charge the capacitor according to an input voltage; and
a comparator, coupled to the capacitor and the first current mirror, configured to compare a capacitor voltage of the capacitor and the reference voltage to determine an on-reset signal.

13. The power converter of claim 9, wherein the frequency adjusting circuit comprises:
a comparator, configured to compare a ground voltage and the output voltage of the output terminal of the switch circuit to output a comparison result;
a second current mirror, coupled to the comparator, configured to generate the load sensing current according to the comparison result;
a resistor unit, coupled to the second current mirror, configured to receive the load sensing current provided by the second current mirror to generate a compensation voltage corresponding to the load sensing current when the switch circuit is off; and
a filter, coupled to the resistor unit, configured to integrate the compensation voltage corresponding to the load sensing current to determine the reference voltage.

14. The power converter of claim 13, wherein when the output voltage of the output terminal of the switch circuit is smaller than zero, the load sensing current is increased when the output voltage is decreased.

15. The power converter of claim 9, wherein when a duty cycle of the switch circuit is a constant, the frequency adjusting circuit is configured to compensate the load sensing current to increase an on period of the on-time signal and an off period of the switch circuit.

16. A switching operation method for a power converter, wherein the power converter comprises a switch circuit and an on-time controller, and the on-time controller comprises an on-time controlling circuit and a frequency adjusting circuit, the switching operation method comprising:
controlling, by the on-time controlling circuit, an on-time signal of a switch circuit of the power converter according to a reference voltage, wherein the reference voltage is varied according to an output voltage of an output terminal of the switch circuit; and
sensing, by the frequency adjusting circuit, the output voltage of the output terminal of the switch circuit to generate a load sensing current according to the output voltage, and providing the load sensing current to the on-time controlling circuit for compensating the reference voltage to adjust the on-time signal of the switch circuit and a switching frequency of the switch circuit.

17. The switching operation method for the power converter of claim 16, further comprising:
generating, by a first current mirror of the on-time controlling circuit, an input current to charge a capacitor according to an input voltage; and
comparing, by a comparator of the on-time controlling circuit, a capacitor voltage of the capacitor and the reference voltage to determine an on-reset signal.

18. The switching operation method for the power converter of claim 16, further comprising:
comparing, by a comparator of the frequency adjusting circuit, a ground voltage and the output voltage of the output terminal of the switch circuit to output a comparison result;
generating, by a second current mirror of the frequency adjusting circuit, the load sensing current according to the comparison result;

receiving, by a resistor unit of the frequency adjusting circuit, the load sensing current provided by the second current mirror to generate a compensation voltage corresponding to the load sensing current when the switch circuit is off; and integrating, by a filter of the frequency adjusting circuit, the compensation voltage corresponding to the load sensing current to determine the reference voltage.

19. The switching operation method for the power converter of claim 16, wherein when the output voltage of the output terminal of the switch circuit is smaller than zero, the load sensing current is increased when the output voltage is decreased.

20. The switching operation method for the power converter of claim 16, wherein when a duty cycle of the switch circuit is a constant, the frequency adjusting circuit is configured to compensate the load sensing current to increase an on period of the on-time signal and an off period of the switch circuit.

* * * * *